United States Patent
Xia et al.

(10) Patent No.: US 10,274,628 B2
(45) Date of Patent: Apr. 30, 2019

(54) ACOUSTIC DEVICE FOR REDUCING CABLE WAVE INDUCED SEISMIC NOISES

(71) Applicant: Halliburton Energy Services, Inc., Houston, TX (US)

(72) Inventors: Hua Xia, Huffman, TX (US); Avinash Vinayak Taware, The Woodlands, TX (US); David Andrew Barfoot, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 92 days.

(21) Appl. No.: 15/316,895

(22) PCT Filed: Jul. 31, 2015

(86) PCT No.: PCT/US2015/043071
§ 371 (c)(1),
(2) Date: Dec. 7, 2016

(87) PCT Pub. No.: WO2017/023239
PCT Pub. Date: Feb. 9, 2017

(65) Prior Publication Data
US 2017/0199294 A1    Jul. 13, 2017

(51) Int. Cl.
*G01V 1/48*     (2006.01)
*G01H 9/00*     (2006.01)
(Continued)

(52) U.S. Cl.
CPC ............... *G01V 1/48* (2013.01); *G01H 9/004* (2013.01); *G01V 1/226* (2013.01); *G01V 1/46* (2013.01)

(58) Field of Classification Search
CPC . G01V 1/48; G01V 1/42; G01V 1/226; G01V 1/46; G01H 9/004
(Continued)

(56) References Cited

U.S. PATENT DOCUMENTS

| 5,171,943 A | 12/1992 | Balogh et al. |
| 5,363,342 A | 11/1994 | Layton et al. |

(Continued)

FOREIGN PATENT DOCUMENTS

| WO | 2004113677 A1 | 12/2004 |
| WO | 2008142586 | 11/2008 |

(Continued)

OTHER PUBLICATIONS

TDI-7000 TDM Fiber Interrogator, Data Sheet, Rev E, 2013.
(Continued)

*Primary Examiner* — Daniel L Murphy
(74) *Attorney, Agent, or Firm* — Benjamin Fite; C. Tumey Law Group PLLC (57) ABSTRACT

A distributed acoustic sensing cable including an optical fiber waveguide configured to provide light signal transmission and an acoustic device coupled to the optical fiber waveguide and configured to provide acoustic signal transmission. The acoustic device includes a polymer composite having reinforced fibers embedded therein. The polymer composite having acoustic waveguides for attenuating undesirable acoustic waves propagating along the distributed acoustic sensing cable and optical fibers embedded within the polymer composite that extend along an axial length of the acoustic device that facilitate the light signal transmission.

18 Claims, 8 Drawing Sheets

(51) Int. Cl.
*G01V 1/22* (2006.01)
*G01V 1/46* (2006.01)

(58) Field of Classification Search
USPC .......................................................... 367/35
See application file for complete search history.

(56) References Cited

U.S. PATENT DOCUMENTS

| | | | |
|---|---|---|---|
| 5,367,376 A | 11/1994 | Lagakos et al. |
| 5,510,582 A | 4/1996 | Birchak et al. |
| 5,852,262 A | 12/1998 | Gill et al. |
| 6,072,567 A | 6/2000 | Sapack |
| 6,082,484 A | 7/2000 | Molz et al. |
| 6,211,964 B1 | 4/2001 | Luscombe et al. |
| 6,285,806 B1 | 9/2001 | Kersey et al. |
| 6,384,919 B1 | 5/2002 | Fersht et al. |
| 6,615,949 B1 | 9/2003 | Egerev et al. |
| 6,850,461 B2 | 2/2005 | Maas et al. |
| 6,899,197 B2 | 5/2005 | Arian et al. |
| 6,995,500 B2 | 2/2006 | Yogeswaren |
| 7,075,215 B2 | 7/2006 | Yogeswaren |
| 7,274,441 B2 | 9/2007 | Payton |
| 7,512,294 B2 | 3/2009 | Wang et al. |
| 7,512,309 B2 | 3/2009 | Aoyagi et al. |
| 7,650,742 B2 | 1/2010 | Ushijima |
| 7,724,998 B2 | 5/2010 | Parris et al. |
| 7,760,977 B2 | 7/2010 | Curdt et al. |
| 7,764,363 B2 | 7/2010 | Hayward et al. |
| 7,920,765 B2 | 4/2011 | Varkey |
| 8,000,572 B2 | 8/2011 | Varkey |
| 8,204,348 B2 | 6/2012 | Keller et al. |
| 8,408,064 B2 | 4/2013 | Hartog et al. |
| 8,412,011 B2 | 4/2013 | Yasutomi et al. |
| 8,437,220 B2 | 5/2013 | Camwell et al. |
| 8,478,095 B2 | 7/2013 | Takeda et al. |
| 8,520,195 B2 | 8/2013 | Ramos et al. |
| 8,605,542 B2 | 12/2013 | Coates et al. |
| 8,678,041 B2 | 3/2014 | Quigley et al. |
| 2004/0197059 A1 | 10/2004 | Castellani et al. |
| 2007/0153629 A1 | 7/2007 | Drumheller et al. |
| 2010/0116510 A1 | 5/2010 | Varkey et al. |
| 2011/0286304 A1 | 11/2011 | Thigpen et al. |
| 2012/0067118 A1 | 3/2012 | Hartog et al. |
| 2012/0111104 A1 | 5/2012 | Taverner et al. |
| 2014/0064028 A1 | 3/2014 | Coates et al. |

FOREIGN PATENT DOCUMENTS

| | | |
|---|---|---|
| WO | 2011037974 | 3/2011 |
| WO | 2012028845 A1 | 3/2012 |
| WO | 2013126054 A1 | 8/2013 |
| WO | 2015023753 A1 | 2/2015 |

OTHER PUBLICATIONS

Johannessen, SPE 149602, "Distributed Acoustic Sensing—A New Way of Listening to Your Well/Reservoir," 2012.
ISR/WO for PCT/US2015/043071 dated Jul. 31, 2015.
Extended European Search Report from EP App. No. 15900508.1 dated Dec. 13, 2018.

ACOUSTIC DEVICE FOR REDUCING CABLE WAVE INDUCED SEISMIC NOISES

BACKGROUND

Using optical fiber cable as a distributed acoustic sensing cable is an emerging technology, potentially serving as a next-generation downhole acoustic/seismic logging tool for vertical seismic profiling. The principle is to use optical fiber to listen to acoustic events from a surrounding medium. A fiber optic cable is typically deployed from a wellhead into a borehole, and every section of the cable length acts a hydrophone or geophone. The optical fiber becomes attractive because it enables vibration sensing, similar to a single component of a geophone, when every meter of a fiber sensing cable can detect vibration at its location separately from all other locations, allowing for thousands of vibration sensors on a single cable. From the detected acoustic signals, one may easily perform a vertical seismic profile of a borehole.

For a wireline deployment of the sensing cable, where the cable is not clamped to tubing or cemented in behind the wellbore casing, the observed borehole stratigraphy is often contaminated by various noises specifically from acoustic sensing cable-borne waves, excited by surface vibration near the wellhead and many other artificial sources. In this case, any mechanical movement of the wellhead, excited by machine vibration and natural events, could induce downward acoustic cable waves (longitudinal and shear) propagation along the cable. On the other hand, these cable waves may be created by downhole fluid (liquid or mud) flow, specifically at casing joints or a dramatic change in borehole diameter.

Existing distributed acoustic sensing cables are based on optical fibers sealed within hollow metal tubing. The field installation is to feed the cable through the wellhead and freely hang the cable inside the wellbore with a weight or a clamping tool at the end of the cable. When a fiber optic cable is deployed from the wellhead into the borehole, the detected acoustic signals may be easily contaminated by various acoustic noises. Acoustic sensing cable waves are excited by the wellhead vibration, for example, and can propagate long distances without significant decay, and can be reflected at different acoustic impedance interfaces. Field trials have shown that the recorded vertical seismic profiles with distributed acoustic sensing technology deployed via wireline or slickline often contain high-amplitude cable waves that greatly degrade the observed borehole seismic data quality. In fact, acoustic cable waves can propagate a long distance without significant decay and can be reflected at different acoustic impedance interfaces multiple times. These acoustic waves are guided along the cable and remain robust over a long propagating distance. In a more complicated case, downward and upward propagated cable waves from multiple reflections may induce complicated effects that cannot be fully removed from the recorded seismic data from subsequent processing steps. Previous efforts in removing such cable-borne noise included changing the tension of the sensing cable below the wellhead assembly. However, this cable slack may potentially cause sensing cable warping. Another effort included modeling and signal processing with different filters, such as velocity filter, low- and high-filters, etc. Post-data processing with different filtering methods may eliminate some of the noises but no effective method has been found to be capable of fully removing the cable-wave induced acoustic noises.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates to equipment used during subterranean formation operations and, more particularly, to distributed acoustic sensing cables including optical fibers that enable downhole acoustic/seismic logging for distributed vertical seismic profiling detection.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Distributed acoustic sensing technology is implemented as a downhole acoustic/seismic logging service tool for downhole leak detection, vertical seismic profiling, flow assurance, fracture, and production control and optimization. It is desirable to improve existing acoustic sensing cable designs with an intrinsic mechanism to suppress cable-wave induced seismic noises. The present disclosure relates to a "cable wave remover" acoustic device that can be used to suppress or remove cable-wave induced acoustic noises to ensure capture of high-quality acoustic/seismic data from a distributed acoustic sensing cable that is comparable to hydrophone and geophone implementations. Such an acoustic sensing cable design has significant benefits for various downhole and subsea hydrocarbon production applications.

The acoustic device can be depicted as a single- or a multi-stage acoustic waveguide based acoustic device, which utilizes different acoustic impedance polymeric composite materials to dissipate acoustic energy of the cable waves. For example, a single-stage cable-wave remover acoustic device can be made from (High-Z/Low-Z/High-Z or Low-Z/Mid-Z/Low-Z) cascaded polymer materials, which could effectively suppress about 60% of the cable wave acoustic energy. However, a multi-stage cable-wave remover acoustic device, n*(High-Z/Low-Z/High-Z or Low-Z/Mid-Z/Low-Z), could significantly dissipate about 98% of the cable wave acoustic energy. The use of such impedance modulated cable wave remover acoustic devices can enable a distributed acoustic sensing cable to provide the same quality of acoustic/seismic data as single-point hydrophone or geophone implementations, and become a distributed acoustic/seismic logging service tool.

In some aspects, a distributed acoustic sensing cable includes an optical fiber waveguide configured to provide light signal transmission, and an acoustic device coupled to the optical fiber waveguide that is configured to provide acoustic signal transmission. The acoustic device may include a polymer composite having reinforced fibers embedded therein. The polymer composite can have acoustic waveguides for attenuating undesirable acoustic waves propagating along the distributed acoustic sensing cable and optical fibers embedded within the polymer composite that extend along an axial length of the acoustic device that facilitate the light signal transmission.

Figure 1:
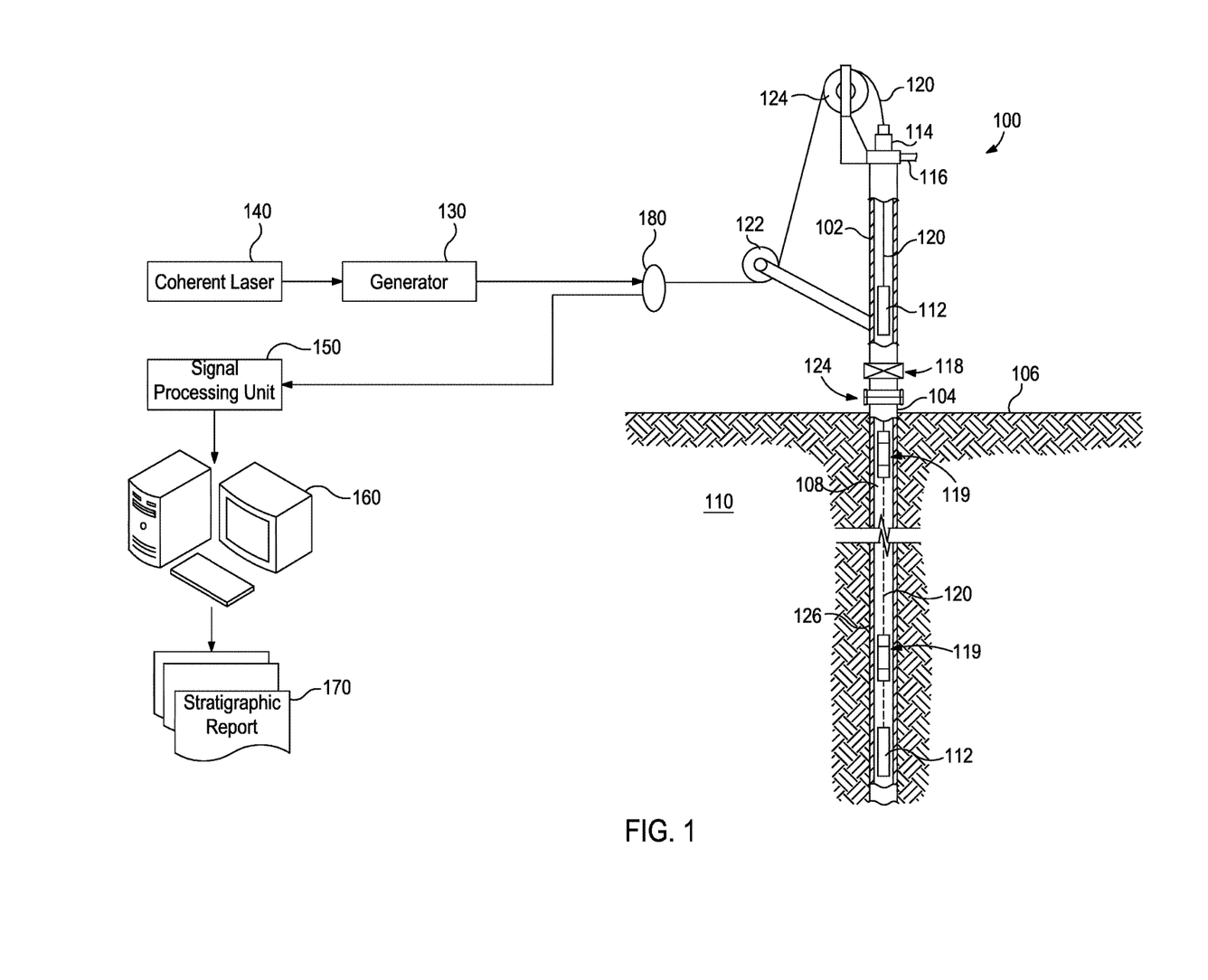
FIG. 1 is a schematic diagram of a wellbore system that may embody the principles of the present disclosure.

FIG. 1 is a schematic diagram of a wellbore system 100 that may embody the principles of the present disclosure. As illustrated, the wellbore system 100 includes a lubricator 102 operatively coupled to a wellhead 104 installed at the surface 106 of a wellbore 108. The wellbore system 100 also includes a surface casing 124 above the surface 106 and a production casing 126 extending into a depth of the wellbore 108.

As illustrated, the wellbore 108 extends from the surface 106 and penetrates a subterranean formation 110 for the purpose of recovering hydrocarbons therefrom. While shown as extending vertically from the surface 106 in FIG. 1, it will be appreciated that the wellbore 108 may equally be deviated, horizontal, and/or curved over at least some portions of the wellbore 108, without departing from the scope of the disclosure. The wellbore 108 may be cased, open hole, contain tubing, and/or may generally be characterized as a hole in the ground having a variety of cross-sectional shapes and/or geometries as are known to those of skill in the art. Furthermore, it will be appreciated that embodiments disclosed herein may be employed in onshore or offshore wells, specifically for oil/gas industrial downhole logging services that can survive harsh environmental conditions in both temperature up to 200° C. and 20-30 Kpsi pressure.

The lubricator 102 may be coupled to the wellhead 104 using a variety of known techniques, such as a clamped or bolted connection. Moreover, additional components (not shown), such as a tubing head and/or adapter, may be positioned between the lubricator 102 and the wellhead 104. The lubricator 102 may be an elongate, high-pressure pipe or tubular that provides a means for introducing a downhole tool 112 into the wellbore 108 in order to undertake a variety of servicing operations within the wellbore 108. The top of the lubricator 102 may include a stuffing box 114 fluidly coupled to a high-pressure grease-injection line 116 used to introduce grease or another type of sealant into the stuffing box 114 in order to generate a seal. The lower part of the lubricator 102 may include one or more valves 118, such as an isolating valve or swab valve.

A sensing cable 120 is extended into the lubricator 102 via the stuffing box 114 and attached at one end to the downhole tool 112. In one or more implementations, the sensing cable 120 is part of a distributed acoustic sensing system that is used for downhole vertical seismic profiling measurement. In this embodiment, the sensing cable 120 is made from optical fiber embedded wireline or slickline cable, and deployed inside the wellbore 108 with a weight bar or clamping tool attached to the end to allow controlling the tension of the sensing cable. In other embodiments, however, the principles of the present disclosure may be equally applicable to permanent vertical seismic profiling arrangements, where the sensing cable 120 is alternatively permanently attached to the inside or the outside of the production casing 126, without departing from the scope of the disclosure.

In one or more implementations, the downhole tool 112 is a part of or coupled to a "cable wave remover" acoustic device 119, which is installed and connected to the sensing cable 120 for detecting acoustic signals along the cable length inside the wellbore 108. The acoustic device 119 may comprise an acoustic signal detection instrument that is based on coherent Rayleigh scattering from an interrogation light signal, which is generated by a coherent laser 140. The interrogation light signal may be a modulated continuous wave or pulsed laser light fed through a pulse generator 130, and the backscattered signal is analyzed by an optical phase demodulation system, shown in FIG. 1 as a signal processing unit 150.

The sensing cable 120 provides a conveyance means used to transport the acoustic device 119 into the wellbore 108 to undertake distributed sensing operations. In this respect, the acoustic device 119 may be positioned within the wellbore 108. The sensing cable 120 is generally fed to the lubricator 102 from a spool or drum (not shown) and through one or more sheaves 122, 124 before being introduced into the stuffing box 114 which provides a seal about the sensing cable 120 as it slides into the lubricator 102. Those skilled in the art will readily recognize that the arrangement and various components of the lubricator 102 and the wellhead 104 are described merely for illustrative purposes and therefore should not be considered limiting to the present disclosure. Rather, many variations of the lubricator 102 and the wellhead 104 may be implemented, without departing from the scope of this disclosure. The sensing cable 120 may include or be coupled to a fiber optic cable (not shown) arranged along the production casing 126. The fiber optic cable may include cross-coupling protectors at every other joint location of the fiber optic cable. The sensing cable 120 may be communicably coupled to the signal processing unit 150 through a coupler 180 at the surface 106, which may collect measurements gathered by the downhole tool 112.

The measurements may be analyzed by a computing system 160 at the surface 106. The computing system 160 can then generate one or more stratigraphic reports 170, which may include 2D or 3D images of the formation 110. As such, the present disclosure can relate to wellbore structural integrity monitoring, single-phase and multiphase flow assurance, downhole leaks in tubing, casing annuli and hydrocarbon production control and optimization.

Figure 2A:
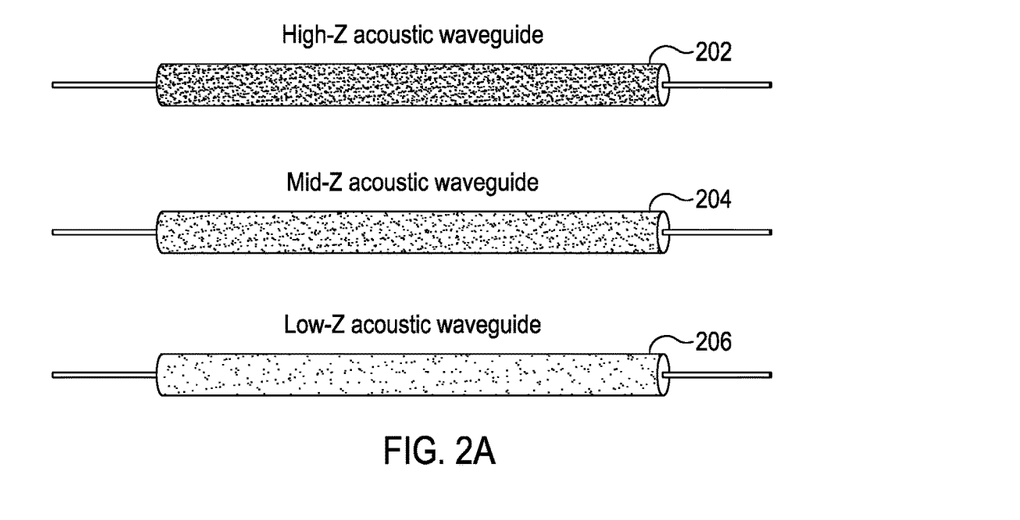
FIGS. 2A and 2B illustrate examples of a single-stage acoustic device in accordance with one or more embodiments of the subject technology, with FIG. 2A illustrating three exemplary acoustic waveguides and FIG. 2B illustrating two configurations for the single-stage acoustic device.
Figure 2B:
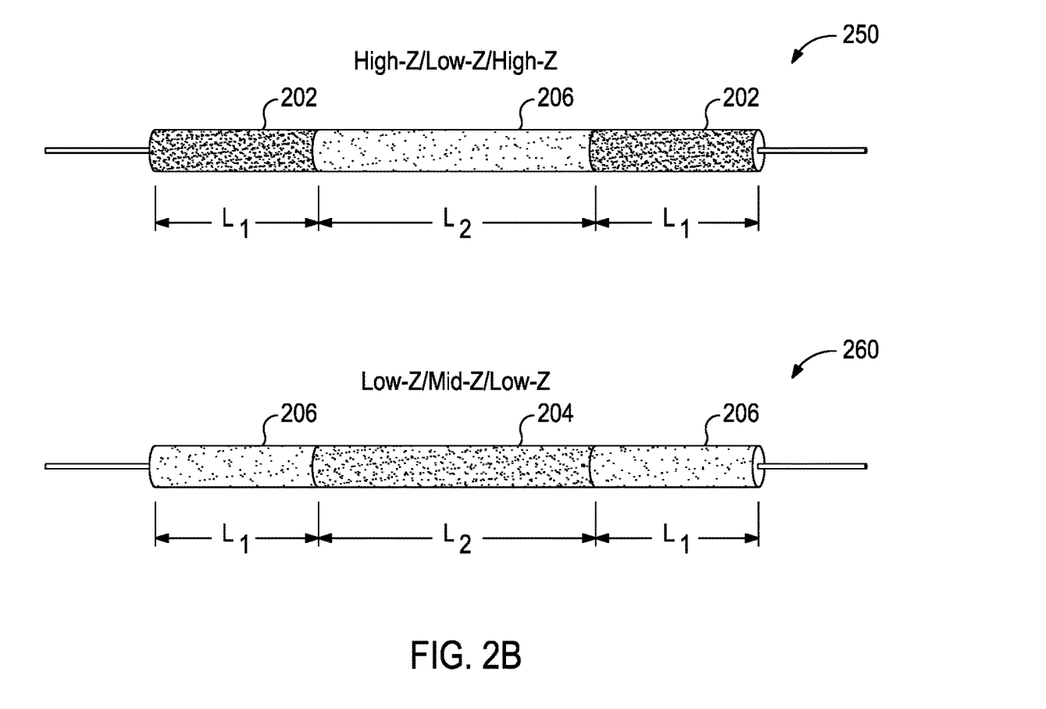

FIGS. 2A and 2B illustrate examples of a single-stage acoustic device in accordance with one or more embodiments of the subject technology, with FIG. 2A illustrating three exemplary acoustic waveguides and FIG. 2B illustrating two configurations for a single-stage acoustic device. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The acoustic waveguides 202, 204 and 206 may be similar to or the same as the acoustic device 119 of FIG. 1 and, therefore, may each be referred to as an acoustic device configured to remove cable wave energy from the sensing cable 120 conveyed within the wellbore 108, as generally described above. In FIG. 2A, three types of acoustic waveguides are made from different acoustic impedance fiber cable package materials, such as a polymeric composite material with optical fiber embedded inside the acoustic waveguides. For example, acoustic waveguide 202 has a first acoustic impedance depicted as a high impedance (High-Z) polymer material. Acoustic waveguide 204 has a second acoustic impedance depicted as a medium impedance (Mid-Z) polymer material. Acoustic waveguide 206 has a third acoustic impedance depicted as a low impedance (Low-Z) polymer material. In this example, the first acoustic impedance is greater than the second acoustic impedance, and the second acoustic impedance is greater than the first acoustic impedance. In terms of hardness composition, the High-Z polymer material has a harder material composition than the Mid-Z polymer material, and the Mid-Z polymer material has a harder material composition than the Low-Z polymer material. Given that the High-Z polymer material can have the hardest material composition among the three types of acoustic waveguides, the High-Z polymer material can provide a greater reflection coefficient than the Mid-Z polymer material and the Low-Z polymer material. In turn, the Mid-Z polymer material can provide a greater reflection coefficient than the Low-Z polymer material.

In FIG. 2B, two device configurations, such as High-Z/Low-Z/High-Z and Low-Z/Mid-Z/Low-Z, may be made by cascading two types of acoustic waveguides to form the acoustic device, depicted as a single-stage acoustic wave attenuator or remover. As will be appreciated, this configuration can cause acoustic waves to be strongly reflected at Low-Z/High-Z interfaces or mildly reflected at Mid-Z/Low-Z interfaces.

In a first device configuration 250, the acoustic waveguide 202 and the acoustic waveguide 206 are cascaded into a series arrangement. For example, the acoustic waveguide 206 is positioned between two instances of the acoustic waveguide 202 to thereby form a High-Z/Low-Z/High-Z interface. In this example, the transition from the Low-Z material to the High-Z material, in either upstream or downstream cable-induced acoustic wave propagation, can result in a relatively high reflection of the acoustic wave energy due to the amount of difference in impedance between the two polymer materials. In this regard, the greater the difference in impedance between polymer materials arranged adjacent to one another (e.g., Low-Z/High-Z), the greater the reflection that can be observed at that interface.

In a second device configuration 260, the acoustic waveguide 204 and the acoustic waveguide 206 are cascaded into a series arrangement. For example, the acoustic waveguide 204 is positioned between two instances of the acoustic waveguide 206. In this example, the transition from the Low-Z material to the Mid-Z material can result in a relatively mild reflection due to the relative low difference in impedance between the two polymer materials.

As used herein, the term "interface" can mean a material transition between Low-Z and High-Z materials or transition between Mid-Z and Low-Z materials. As used herein, the terms "interface" and "acoustic impedance mismatched interface" are used interchangeably but the former used for simplicity of discussion. In one or more implementations, the transition can take place between High-Z and Mid-Z materials but acoustic waves at such interface may be mildly reflected due to the smaller difference in impedance between these two materials as opposed to an interface with Low-Z and High-Z materials.

By combining High-Z and Low-Z materials or Mid-Z and Low-Z materials, the single-stage acoustic devices, as shown in FIG. 2B, can have a length of $L=2L_1+L_2$, where $L_2$ is greater than $L_1$. In alternative embodiments, $L_1$ may be greater than $L_2$, without departing from the scope of the disclosure. In reference to the first device configuration 250, the acoustic waveguide 206 can have a length $L_2$ and the acoustic waveguide 202 can have length $L_1$ where the total length of the acoustic device can be the sum of the two instances of the acoustic waveguide 202 and the acoustic waveguide 206. In reference to the second device configuration 260, each of the two instances of the acoustic waveguide 206 can have a length $L_1$ and the acoustic waveguide 204 can have a length $L_2$. Each of the acoustic waveguides 202, 204, 206 may exhibit a diameter ranging from about 3 mm to about 10 mm.

Figure 3A:
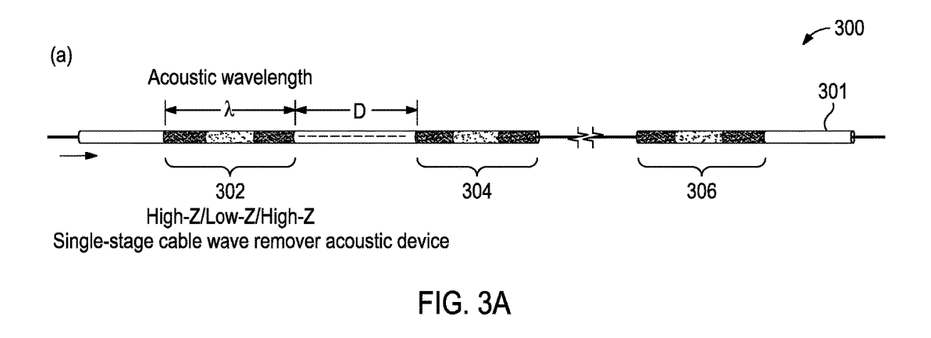
FIGS. 3A-3C illustrate examples of an acoustic device in accordance with one or more embodiments of the subject technology, with FIG. 3A illustrating an exemplary single-stage configuration, FIG. 3B illustrating an exemplary dual-stage configuration and FIG. 3C illustrating an exemplary multi-stage configuration.
Figure 3B:
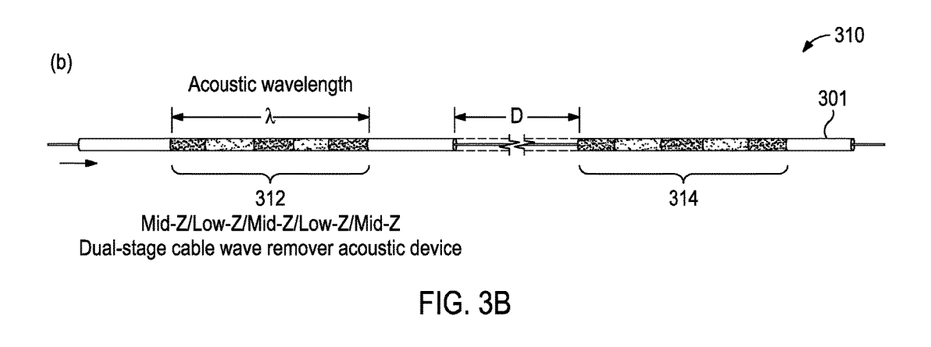
Figure 3C:
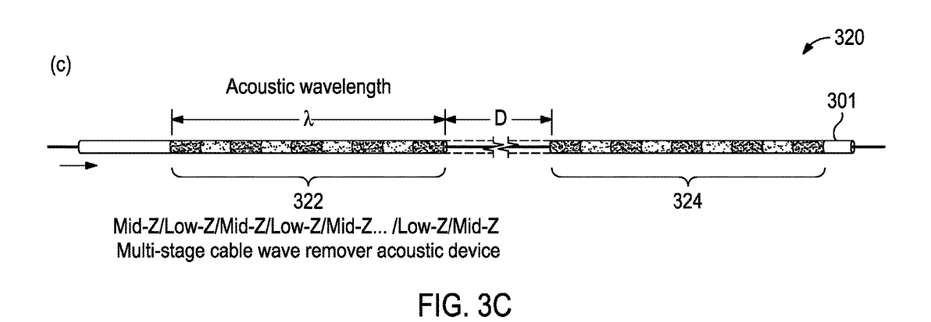

FIGS. 3A-3C illustrate examples of an acoustic device in accordance with one or more embodiments of the subject technology, with FIG. 3A illustrating an exemplary single-stage configuration 300, FIG. 3B illustrating an exemplary dual-stage configuration 310 and FIG. 3C illustrating an exemplary multi-stage configuration 320. Each of the single-stage configuration 300, dual-stage configuration 310 and multi-stage configuration 320 may be similar to or the same as the sensing cable 120 of FIG. 1 and, therefore, may each be referred to as a slickline and otherwise configured to convey the acoustic device 119 into the wellbore 108, as generally described above. Not all of the depicted components may be required, however, and one or more implementations may include additional components not shown in the figure. Variations in the arrangement and type of the components may be made without departing from the scope of the claims as set forth herein. Additional components, different components, or fewer components may be provided, without departing from the scope of the disclosure.

For high-frequency acoustic waves in a range of about 1 kilohertz (kHz) to about 20 kHz, the corresponding acoustic wavelength may be in a range of 0.1 meters to about 3 meters. However, the acoustic wavelength of a 30 Hz seismic signal may be in a range of about 50 meters to about 200 meters. As such, it is desirable to have a distributed acoustic sensing cable with an acoustic device capable of reflecting acoustic wave energy induced by both high-frequency acoustic waves and low-frequency acoustic waves propagating upstream/downstream along the distributed acoustic sensing cable. In this respect, the acoustic device can have a total length (e.g., $L=2L_1+L_2$) comparable to a wavelength of a cable-wave induced acoustic signal.

In FIG. 3A, the single-stage configuration 300 depicts an acoustic device 302 coupled to an optical fiber waveguide 301 and configured to provide acoustic signal transmission. The acoustic device 302 may be coupled to the optical fiber waveguide 301 through a fiber interconnector. In one or more implementations, the acoustic device 302 is formed as part of the optical fiber waveguide 301. The acoustic device 302 can include a polymer composite having reinforced fibers embedded therein. The polymer composite can have acoustic waveguides for attenuating undesirable acoustic waves propagating along the distributed acoustic sensing cable. In this example, the optical fiber waveguide 301 is part of the distributed acoustic sensing cable but may be depicted as the distributed acoustic sensing cable depending on implementation.

The acoustic device 302 can have optical fibers embedded within the polymer composite and extending along an axial length of the acoustic device 302. In this regard, the axial length may be expressed as $L=2L_1+L_2$, and comparable to an acoustic wavelength $\lambda$. The acoustic wavelength may correspond to acoustic waves relating to a surrounding formation or environment (e.g., oil, water, rock surface, etc.).

The acoustic device 302 includes at least two first type acoustic waveguides depicted as High-Z materials and at least one second type acoustic waveguide depicted as a Low-Z material. As illustrated in FIG. 3A, the two first type acoustic waveguides are separated by the second type acoustic waveguide. In this example, the first acoustic impedance is greater than the second acoustic impedance. In other words, the acoustic device 302 represents a single-stage device consisting of three acoustic waveguides in a series arrangement having a total length that corresponds to the axial length of the acoustic device 302 (or at least comparable to a wavelength $\lambda$).

During operation, cable-induced acoustic wave signals travel along the optical fiber waveguide 301, and at least a portion of acoustic wave energy relating to the cable-induced acoustic wave signals is reflected at each interface (e.g., the transition from the Low-Z material to the High-Z material). In one or more implementations, the amount of reflection increases as the acoustic wave energy progresses through the acoustic device 302. In this example, the acoustic wave energy may be partially reflected at a first interface (e.g., first transition from Low-Z to High-Z) while a remaining portion of the acoustic wave energy may transmit to the next interface (e.g., next transition from Low-Z to High-Z) of the acoustic device 302 for further reflection. Given that the Low-Z acoustic waveguide has a softer material than the High-Z acoustic waveguide, the impedance of the Low-Z acoustic waveguide is smaller as well. In this regard, the remaining portion of the acoustic wave energy can transmit through the Low-Z acoustic waveguide from a preceding boundary with a first High-Z acoustic waveguide toward the next boundary with a second High-Z acoustic waveguide.

The distributed acoustic sensing cable can include a second single-stage acoustic device 304 coupled to the optical fiber waveguide 301 and separate from the acoustic device 302 for at least an axial distance D of the optical fiber waveguide 301. In this example, the distributed acoustic sensing cable may have a number of such single-stage acoustic devices (e.g., acoustic devices 302, 304 and 306) with a separation (e.g., the axial distance D) from one another ranging from a few ten meters to a few hundred meters. In this regard, the distributed acoustic sensing cable can have cable-wave induced energy substantially attenuated (or suppressed) from the optical fiber waveguide 301 substantially throughout the depth of a wellbore.

In FIG. 3B, the double-stage configuration 310 depicts an acoustic device 312 with acoustic waveguides including three third type acoustic waveguides depicted as Mid-Z materials and two second type acoustic waveguide depicted as Low-Z materials. In the double-stage configuration 310, the acoustic device 312 consists of five acoustic waveguides in a series arrangement having a total length that corresponds to the axial length of the acoustic device. In particular, the five acoustic waveguides may be made of two different polymeric composite materials (e.g., Mid-Z, Low-Z) cascaded in an alternating arrangement. In this respect, the double-stage configuration 310 has five interfaces based on the two stages of the acoustic device, which can reduce acoustic wave energy transmission below 1%. The number of interfaces may be proportional to the number of stages in the acoustic device. For example, the number of interfaces can be computed as $3n-1=x$, where n is the number of stages, and x is the number of interfaces. In this example, $3n-1=x$ can be expressed as $(3*2)-1=5$. In one or more implementations, the distributed acoustic sensing cable includes a second dual-stage acoustic device 314 coupled to the optical fiber waveguide 301 and separate from the acoustic device 312 for at least an axial distance D of the optical fiber waveguide 301.

In FIG. 3C, the multi-stage configuration 320 depicts an acoustic device 322 with more than five acoustic waveguides in a series arrangement having a total length that corresponds to the axial length of the acoustic device 322. As shown in FIG. 3C, the acoustic device 322 has at least nine acoustic waveguides made of two different polymeric composite materials (e.g., Mid-Z, Low-Z) cascaded in an alternating arrangement. In this respect, the multi-stage configuration 320 has eight interfaces based on three cascaded stages of the acoustic device 322 (e.g., $3n-1$).

For 1<Mid-Z/Low-Z<3 materials, acoustic impedance mismatched interfaces may be needed to remove cable waves. To attenuate a cable-induced acoustic wave within an acoustic wavelength range, a single acoustic impedance mismatched interface may reflect about 80% with High-Z/Low-Z≈10 materials. However, Mid-Z/Low-Z≈3 materials may reflect about 50% of the cable-induced acoustic waves. To effectively attenuate cable waves, multiple acoustic impedance mismatched interfaces may be needed.

Figure 4:
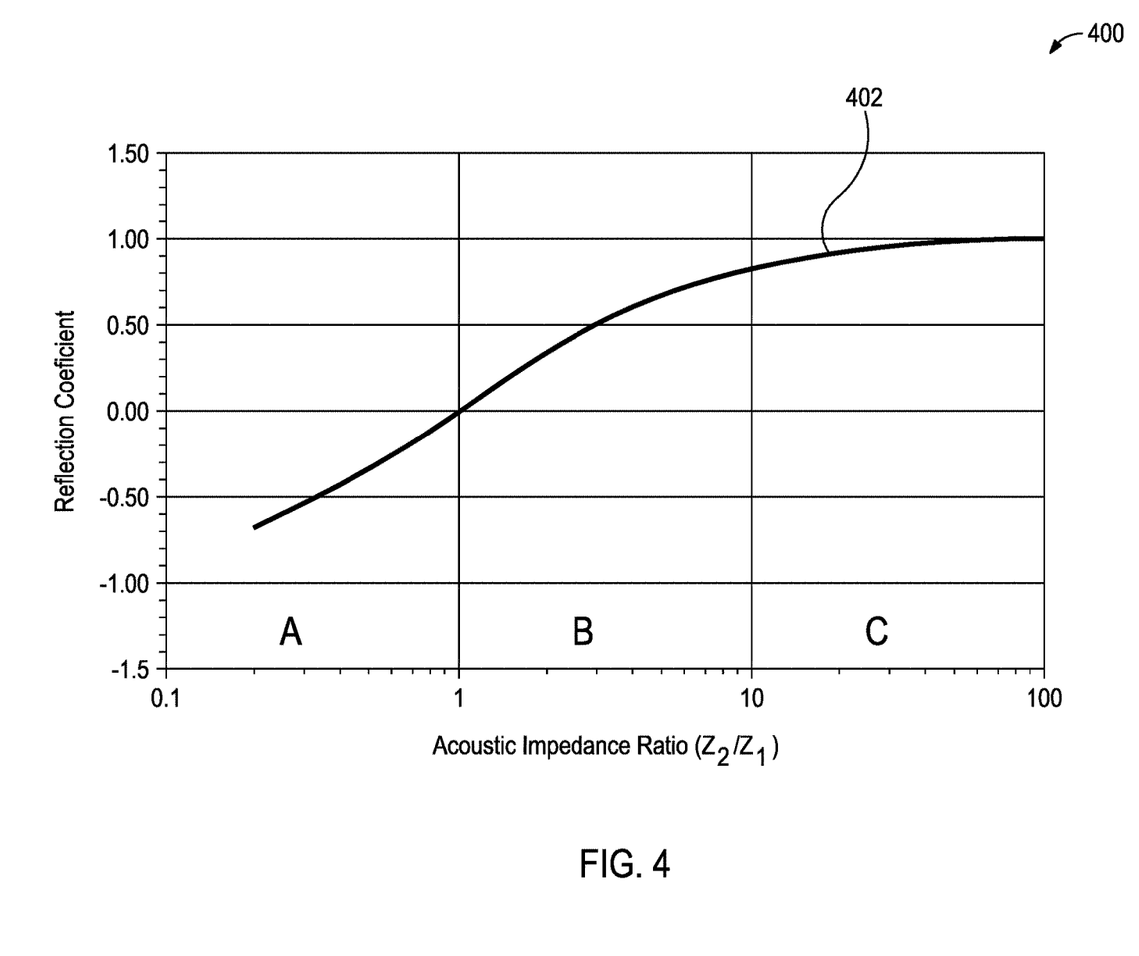
FIG. 4 is a plot illustrating reflection coefficient values versus acoustic impedance ratio values.

FIG. 4 is a plot 400 illustrating reflection coefficient values versus corresponding acoustic impedance ratio values in accordance with one or more embodiments of the subject technology. As illustrated, the plot 400 includes data points depicted as a curve 402 relating to a reflection coefficient value as a function of an acoustic impedance ratio value (e.g., $Z_2/Z_1$). In this regard, $Z_1$ depicts acoustic impedance of the preceding acoustic waveguide of an interface and $Z_2$ depicts acoustic impedance of the next acoustic waveguide of the interface. As such, the ratio represents a ratio of the acoustic impedance corresponding to the next acoustic waveguide to the acoustic impedance corresponding to the preceding acoustic waveguide. The plot 400 arranges the data points in three separate regions such as A, B and C representing respective ranges of reflection.

In operation, a propagating acoustic cable wave is reflected by an acoustic impedance mismatched interface. The reflection coefficient can be in a range of −1.0 to 1.0. Plot 400 illustrates that an acoustic impedance ratio in a range of 1 to 10, as indicated by region B, can effectively reflect acoustic wave energy in a range of 0% to 82%. For an acoustic impedance ratio of less than 1, as indicated by region A, the negative reflection coefficient corresponds to a phase shift in the acoustic wave with an angle between 0 and 180 degrees. For an acoustic impedance ratio greater than 10, as indicated by region C, an acoustic wave can be substantially reflected from the acoustic impedance mismatched interface. In one or more implementations, the acoustic impedance mismatched interface is configured to transmit (T), absorb (A), and reflect (R) at least a portion of the acoustic wave energy with energy conservation expressed as T+A+R=1. In this respect, the transmitted acoustic energy is proportional to the transmission coefficient.

Figure 5:
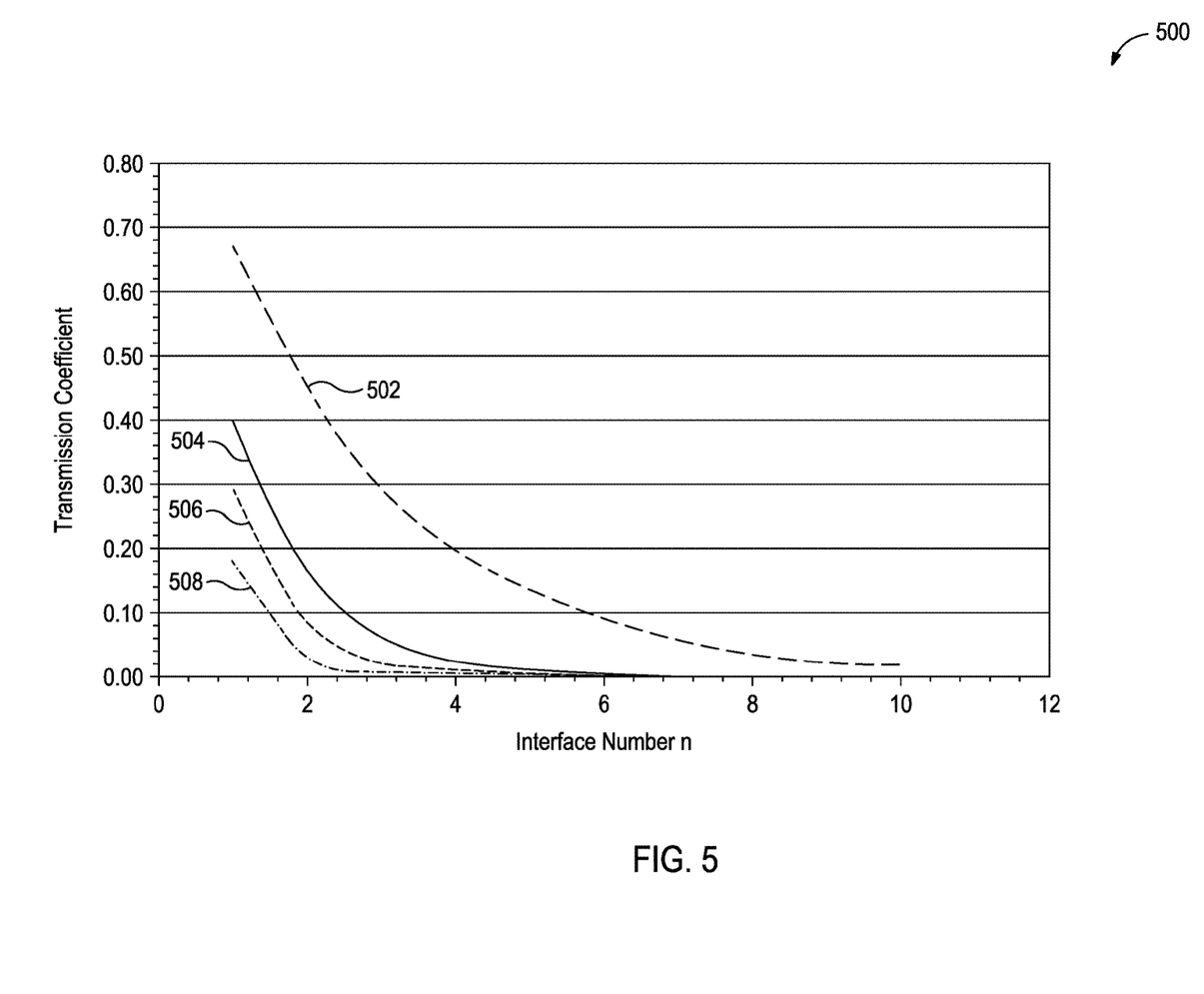
FIG. 5 is a plot illustrating transmission coefficient values versus interface number values in accordance with one or more embodiments of the subject technology.

FIG. 5 is a plot 500 illustrating transmission coefficient values versus interface number values in accordance with one or more embodiments of the subject technology. As illustrated, the plot 500 includes data points depicted as curves 502, 504, 506 and 508 corresponding to respective acoustic impedance ratio values (e.g., $Z_2/Z_1$). In this regard, $Z_1$ depicts acoustic impedance of the preceding acoustic waveguide of an interface and $Z_2$ depicts acoustic impedance of the next acoustic waveguide of the interface. As such, the ratio represents a ratio of the acoustic impedance corresponding to the next acoustic waveguide to the acoustic impedance corresponding to the preceding acoustic waveguide. Curve 502 relates to an acoustic impedance ratio of 2, curve 504 relates to an acoustic impedance ratio of 4, curve 506 relates to an acoustic impedance ratio of 6, and curve 506 relates to an acoustic impedance ratio of 10. As such, FIG. 5 shows an estimation of the transmitted acoustic wave after attenuation by a "cable wave remover" acoustic device at different acoustic impedance interfaces.

For a $Z_2/Z_1=2$ interface (e.g., the curve 502), the acoustic energy can be attenuated to less than 1% using a 6-stage acoustic device. In this example, the acoustic device may consist of Low-Z and Mid-Z materials cascaded as a multi-stage device (e.g., 6 stages). However, the transmission coefficient can be more efficient using a single-stage acoustic device having an acoustic impedance mismatched interface with $Z_2/Z_1=10$ (e.g., the curve 508), where the transmission coefficient in this implementation can become less than 1% after two interface reflections. Similarly, the transmission coefficient can become less than 1% after two interface reflections using an acoustic impedance mismatched interface with $Z_2/Z_1=6$ (e.g., the curve 506). On the other hand, the transmission coefficient can become less than 1% after three interface reflections using an acoustic impedance mismatched interface with $Z_2/Z_1=4$ (e.g., the curve 504). To make an ideal fiber acoustic sensing cable, high acoustic impedance modulated package materials may provide an effectively intrinsic attenuation mechanism to enable low-noise seismic profiling and distributed acoustic signal detections from a specific geologic location.

Figure 6A:
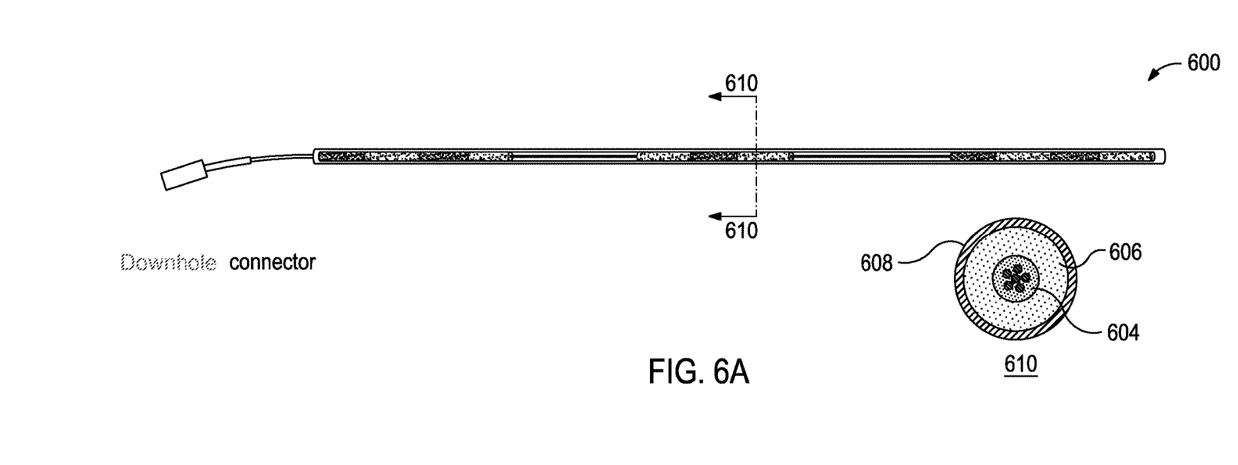
FIGS. 6A and 6B are examples of a distributed acoustic sensing cable implementing various configurations of an acoustic device.
Figure 6B:
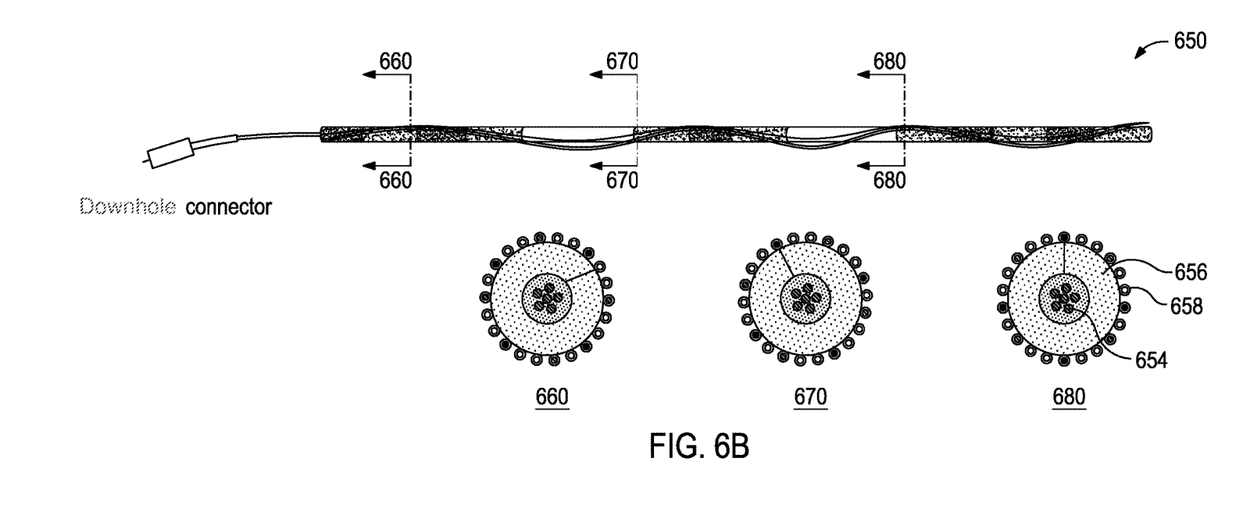

FIGS. 6A and 6B are examples of a distributed acoustic sensing cable implementing various configurations of an acoustic device in accordance with one or more embodiments of the subject technology. More particularly, FIG. 6A illustrates an exemplary composite sensing cable 600 with hollow tubing around an acoustic device, and FIG. 6B illustrates an exemplary composite sensing cable 650 using a twisted arrangement of wires around an acoustic device. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

Each composite sensing cable 600 and 650 may be similar to or the same as the sensing cable 120 of FIG. 1 and, therefore, may each be referred to as a slickline and otherwise configured to convey the acoustic device 119 into the wellbore 108, as generally described above. FIG. 6A also depicts a cross-sectional view of the acoustic device included in the composite sensing cable 600 as taken along the lines 610-610'. As illustrated, the acoustic device may include a polymer composite material 606 disposed around reinforced fibers 604, and a hollow tube 608 disposed around the polymer composite material 606. The acoustic device can be made from [1] hollow metal tubing filled with different density polymer materials, or from [2] carbon fiber reinforced polymer composite materials. No matter which sensing cable package method is implemented, the polymer materials can be utilized to make acoustic impedance modulated cable wave remover devices. In this example, the composite sensing cable 600 may be implemented with a ruggedized drymate downhole connector to ease installation of the cable, but the type of connector can vary depending on implementation without departing from the scope of the present disclosure.

For wireline cable applications, the twisted metal wire fiber acoustic sensing cable of FIG. 6B may be integrated with other optical or electrical signal and power transmission lines. In this respect, at least one of the power transmission lines or the data transmission lines is disposed within the polymer composite material 606. With the hollow tube 608 or metal wires as a sheath, the effective acoustic impedance of an acoustic waveguide or cable wave remover device can be expressed as $Z_i(\text{eff})=Z_i^*(r/R)+Z_m^*(1-r/R)$, where $Z_m$ is metal wire or tube impedance, $Z_i$ (i=high, mid, low) corresponds to the polymer composite materials (see Table 1). The acoustic impedance is defined by $Z=\rho \cdot v$, where v is phase velocity and $\rho$ is the density of the material. When the radius of the hollow tube is a relatively thin wall tube (e.g., $R-r \ll R$), the effective acoustic impedance is dominated by the filled polymer materials.

TABLE 1

| Physical Acoustic Properties | Composite Materials | Acoustic Impedance, Z (MRayls) |
|---|---|---|
| High-Z | 50% CF-PPS | 8.22 |
| Mid-Z | 20% CF-PPS | 5.0 |
| Mid-Z | 25% CF-PEEK | 5.0 |
| Low-Z | 6% SS-PPS | 2.43 |
| High-Z | 60% CF-PEEK | 10.87 |
| Low-Z | 10% CF-PEEK | 2.16 |

Table 1 illustrates a listing of suitable polymer composite materials for making High-Z, Mid-Z, and Low-Z acoustic waveguides, where 50% CF-PPS, 10% CF-PEEK, and 60% CF-PEEK represent carbon fiber reinforced PPS and PEEK with volumetric percentage of 50%, 10% and 60%; and 6% SS-PPS represents 6% stainless steel fiber reinforced PPS.

In another package design, a single fiber acoustic sensing cable may be made from acoustic impedance modulated polymer composite matrix material, in which the carbon fibers are used to reinforce the cable mechanical strength for field deployment.

FIG. 6B includes cross-sectional end views of the composite sensing cable 650 at respective locations along the axial length of the composite sensing cable 650. The composite sensing cable 650 illustrates a polymer composite material 656 disposed around reinforced fibers 654, and a sheath 658 disposed around the polymer composite material 656. In this respect, the sheath 658 can be made of a metal or a polymer. In this embodiment, the sheath 658 is made of metal wires arranged in a twisted pattern. In particular, the metal wires have a different axial orientation at different locations along the axial length of the composite sensing cable 650. For example, a cross-sectional view 660 of the composite sensing cable 650 shows the axial orientation in a first position, a cross-sectional view 670 shows the axial orientation in a second position, and a cross-sectional view 680 shows the axial orientation in a third position. In this example, the composite sensing cable 650 may be implemented with a drymate downhole connector, but the type of connector can vary depending on implementation without departing from the scope of the present disclosure.

The sheath 658 acts as a protective coating for the polymer composite material 656 to mitigate damage to the polymer composite material 656 or components thereof during operation. In some instances, however, the sheath 658 may be excluded from the composite sensing cable 650, without departing from the scope of the present disclosure. The sheath 658 may be made of a metal material with respect to properties including anti-wearing, hermetical sealing, and high mechanical strength. Non-limiting examples of metal materials suitable for use in the sheath 658 may include stainless steel, aluminum, copper, and their alloy compositions.

In some instances, the aforementioned polymers alone may not have sufficient mechanical strength and wearing properties to withstand high pull or compressive forces as either of the composite sensing cables 600 or 650 is pulled, for example, through the high-pressure grease-injection line 116 (FIG. 1) while being run downhole. As such, the polymer composite material 656 may, in some embodiments, further include reinforced continuous or non-continuous fibers to increase mechanical strength and wearing properties. While any suitable fibers may be used to provide mechanical strength properties sufficient to withstand such forces, exemplary fibers include, but are not limited to, carbon fibers, fiberglass, ceramic fibers, aramid fibers, metallic filaments, liquid crystal aromatic polymer fibers, quartz, carbon nanotubes, and the like, and any combination thereof. Metallic fibers and filaments may, in some instances, be composed of materials such as iron, aluminum, cobalt, nickel, tungsten, and the like, and any combination thereof Non-limiting examples of polymers suitable for use in the polymer composite material 606 and 656 may include thermoplastic or thermoset resins including polyolefins, polytetrafluoroethylene-perfluoromethylvinylether polymer (PTFE-MFA), perfluoro-alkoxyalkane polymer (PFA), polytetrafluoroethylene polymers (PTFE, e.g., TEFLON®), ethylene-tetrafluoroethylene polymers (ETFE), ethylene-propylene copolymers (EPC), polysulfone (PSF), polyethersulfone (PES), polyarylether ketone polymers (PAEK), polyetherether ketone (PEEK), polyphenylene sulfide polymers (PPS), modified polyphenylene sulfide polymers, polyether ketone polymers (PEK), maleic anhydride modified polymers, perfluoroalkoxy polymers, fluorinated ethylene propylene polymers, polyvinylidene fluoride polymers (PVDF), polytetrafluoroethylene-perfluoromethylvinylether polymers, polyamide polymers, polyimide polymers, polyurethane, thermoplastic polyurethane, ethylene chloro-trifluoroethylene polymers, chlorinated ethylene propylene polymers, self-reinforcing polymers based on a substituted poly(1,4-phenylene) structure where each phenylene ring has a substituent R group derived from a wide variety of organic groups, and the like, and any combination thereof. In one embodiment, the preferred polymer material has high percentage of crystalline structure. In another embodiment, the preferred polymer material has high glass transition temperature. In the other embodiment, the preferred polymer material has high melting point temperature.

Non-limiting examples of continuous or non-continuous fibers suitable for use in the polymer composite material 606 and 656 may include carbon fibers, silicon carbide fibers, aramid fibers, glass fibers, ceramic fiber, metal filaments, carbon nanotubes, and the like, and any combination thereof. In one embodiment, these fibers may have a length ranging from few millimeters to a few meters. In another embodiment, these fibers may be from a few meters to a few hundred meters. To maintain uniform mechanical strength of the full slickline cable, the heads of the fiber connections at a specific section of the cable may be kept constant. Metallic fibers and filaments may, in some instances, be composed of materials such as iron, aluminum, cobalt, nickel, tungsten, and the like, and any combination thereof. These materials may be dispersed uniformly inside the polymer matrix.

The reinforced fibers 604 and 654 may comprise low-transmission loss optical fibers that are either single-mode or multi-mode and exhibit a transmission bandwidth from about 600 nm to about 1620 nm with its lowest loss bandwidth ranging from about 1000 nm to about 1600 nm. In at least one embodiment, one or more of the reinforced fibers 604 and 654 may exhibit a gradient refractive index (e.g., graded index) across its fiber core to ensure light transmission is strongly guided by the fiber core path that may ensure bending insensitivity and low transmission loss.

Figure 7:
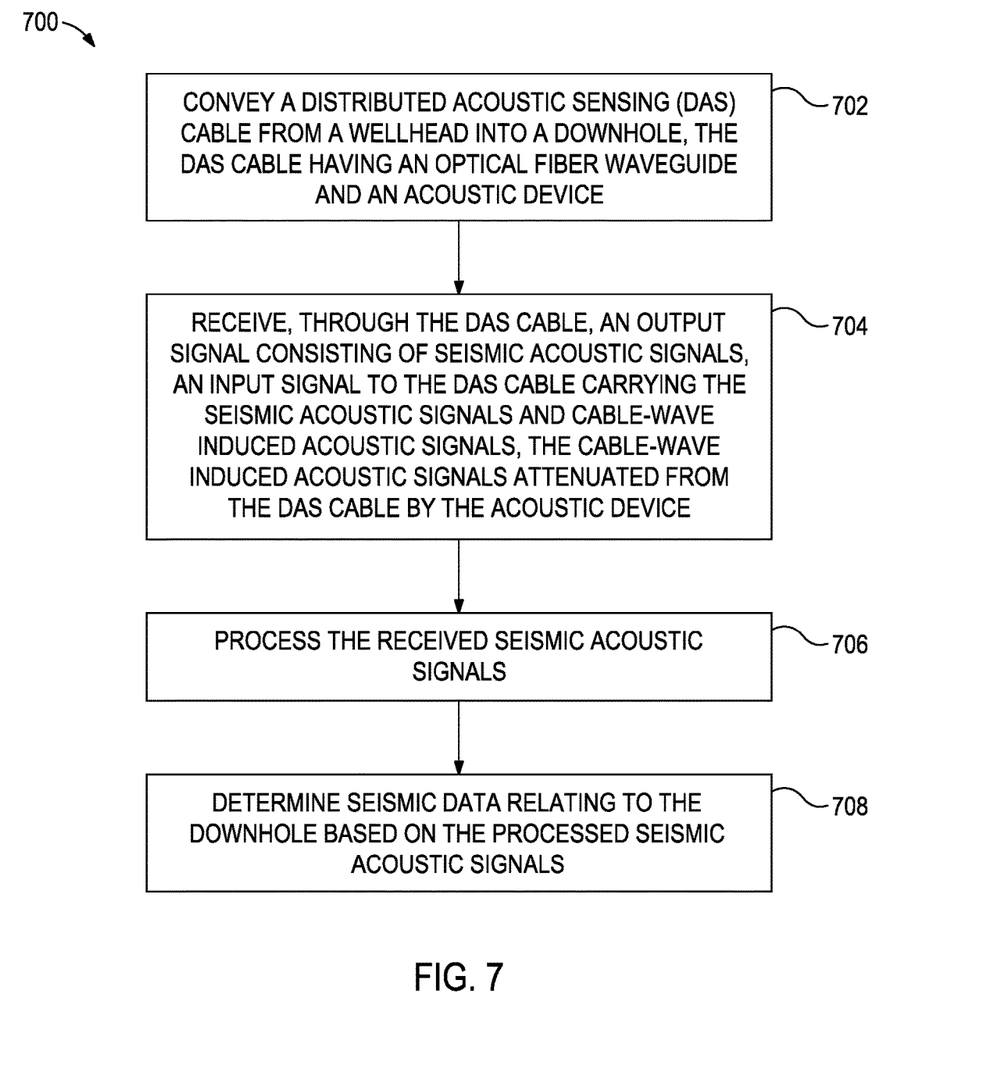
FIG. 7 is a flowchart of an exemplary process for downhole measurements using an exemplary distributed acoustic sensing cable.

FIG. 7 is a flowchart of an exemplary process 700 for downhole measurements using an exemplary distributed acoustic sensing cable in accordance with one or more embodiments of the subject technology. For explanatory purposes, the exemplary process 700 is described herein with reference to the wellbore system 100 of FIG. 1; however, the exemplary process 700 is not limited to the wellbore system 100 of FIG. 1, and the exemplary process 700 may be performed by one or more components of the wellbore system 100, such as the sensing cable 120. Further, for explanatory purposes, the blocks of the exemplary process 700 are described herein as occurring in series, or linearly. However, multiple blocks of the exemplary process 700 may occur in parallel. In addition, the blocks of the exemplary process 700 need not be performed in the order shown and/or one or more of the blocks of the exemplary process 700 need not be performed.

In step 702, a distributed acoustic sensing cable depicted as the sensing cable 120 can be conveyed from a wellhead into a borehole. In this example, the distributed acoustic sensing cable includes an optical fiber waveguide and an acoustic device for attenuating one or more undesired cable wave acoustic energy.

In step 704, an output signal consisting of seismic acoustic signals can be received at a surface through the distributed acoustic sensing cable. An input signal to the distributed acoustic sensing cable may include the seismic acoustic signals and cable-wave induced acoustic signals. In this regard, the cable-wave induced acoustic signals can be attenuated from the distributed acoustic sensing cable by the acoustic device.

In step 706, the received seismic acoustic signals can be processed at the surface. In step 708, seismic data relating to the downhole can be determined based on the processed seismic acoustic signals.

Figure 8:
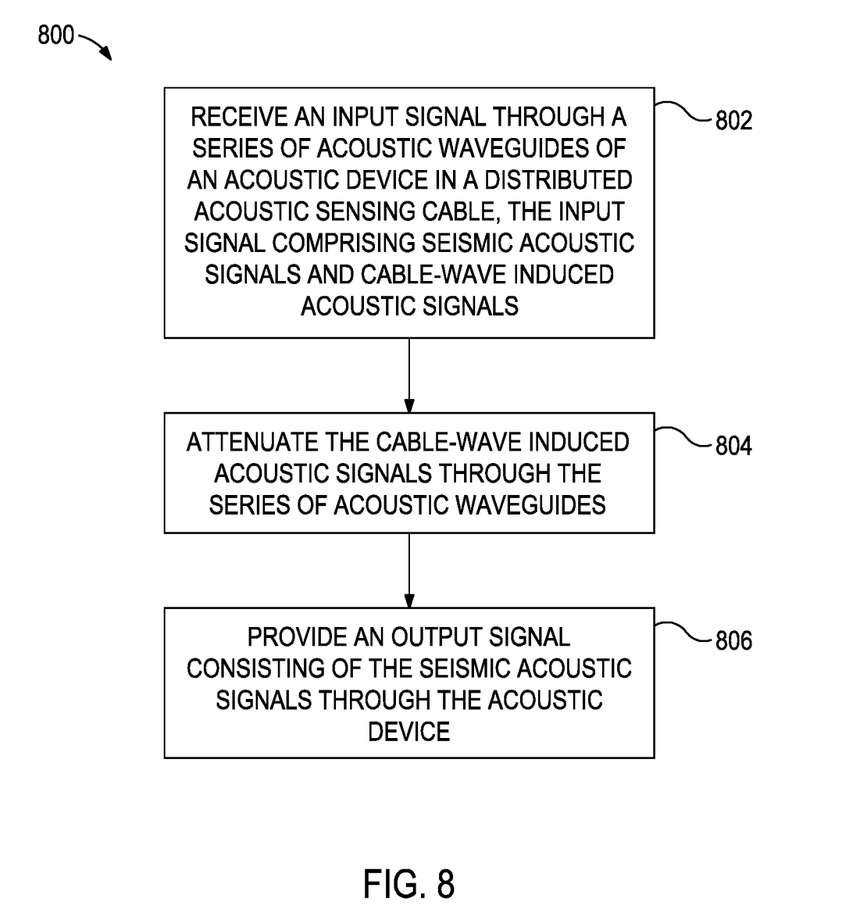
FIG. 8 is a flowchart of an exemplary process for suppressing cable-wave induced acoustic signals using an exemplary acoustic device.

FIG. 8 is a flowchart of an exemplary process 800 for suppressing cable-wave induced acoustic signals using an exemplary acoustic device in accordance with one or more embodiments of the subject technology. For explanatory purposes, the exemplary process 800 is described herein with reference to the wellbore system 100 of FIG. 1; however, the example process 800 is not limited to the wellbore system 100 of FIG. 1, and the exemplary process 800 may be performed by one or more components of the wellbore system 100, such as the acoustic device 119 or the acoustic devices 302, 312 and 322.

Further for explanatory purposes, the blocks of the exemplary process 800 are described herein as occurring in serial, or linearly. However, multiple blocks of the example process 800 may occur in parallel. In addition, the blocks of the exemplary process 800 need not be performed in the order shown and/or one or more of the blocks of the exemplary process 800 need not be performed.

In step 802, the acoustic device can receive an input signal through a series of acoustic waveguides included in the acoustic device. As discussed above, the acoustic device can be part of a distributed acoustic sensing cable for downhole logging applications. The input signal can include seismic acoustic signals and cable-wave induced acoustic signals. The acoustic device can suppress or remove cable-wave induced acoustic noises to ensure capture of high-quality acoustic/seismic data from the distributed acoustic sensing cable that is comparable to hydrophone and geophone implementations.

In step 804, the acoustic device can attenuate the cable-wave induced acoustic signals through the series of acoustic waveguides. In attenuating the cable-wave induced acoustic signals, the acoustic device can transmit acoustic wave energy of the cable-wave induced acoustic signals through the series of acoustic waveguides. The acoustic device can transmit a first portion of the acoustic wave energy through at least one acoustic waveguide of the series of acoustic waveguides. In this example, the first portion can be absorbed by the distributed acoustic sensing cable. In turn, the acoustic device can reflect a second portion of the acoustic wave energy through the at least one acoustic waveguide for further reflection. Since the acoustic device is implemented to suppress or remove cable-wave induced acoustic noises, the second portion of acoustic wave energy is significantly greater than the first portion in many cases. For example, the acoustic device may reflect up to about 80% of the acoustic wave energy using acoustic waveguides configured with an acoustic impedance ratio in a range of 1 to 10. On the other hand, the acoustic device may reflect more than 80% of the acoustic wave energy using acoustic waveguides configured with an acoustic impedance ratio in a range of 10 to 100. In step 806, the acoustic device can provide an output signal consisting of the seismic acoustic signals through the acoustic device for use as downhole acoustic/seismic logging measurements.

Embodiments disclosed herein include:

A. A distributed acoustic sensing cable that includes an optical fiber waveguide that provides light signal transmission, and an acoustic device coupled to the optical fiber waveguide to facilitate acoustic signal transmission, the acoustic device including a polymer composite comprising reinforced fibers embedded therein and having a plurality of acoustic waveguides for attenuating undesirable acoustic waves propagating along the distributed acoustic sensing cable, and a plurality of optical fibers embedded within the polymer composite and extending along an axial length of the acoustic device.

B. A method that includes conveying a distributed acoustic sensing cable from a wellhead into a downhole, the distributed acoustic sensing cable having an optical fiber waveguide and an acoustic device, the acoustic device having a polymer composite and a plurality of optical fibers embedded within the polymer composite, wherein the plurality of optical fibers extends along an axial length of the acoustic device, receiving, through the distributed acoustic sensing cable, an output signal consisting of seismic acoustic signals and an input signal to the distributed acoustic sensing cable including the seismic acoustic signals and cable-wave induced acoustic signals, the cable-wave induced acoustic signals being attenuated from the distributed acoustic sensing cable by the acoustic device, processing the received seismic acoustic signals, and determining seismic data relating to the downhole based on the processed seismic acoustic signals.

C. A method that includes receiving an input signal through a series of acoustic waveguides of an acoustic device in a distributed acoustic sensing cable, the input signal comprising seismic acoustic signals and cable-wave induced acoustic signals, attenuating the cable-wave induced acoustic signals through the series of acoustic waveguides, and providing an output signal consisting of the seismic acoustic signals through the acoustic device.

Each of embodiments A, B, and C may have one or more of the following additional elements in any combination: Element 1: wherein the plurality of acoustic waveguides includes at least one first type acoustic waveguide made of a first polymer material having a first acoustic impedance and at least one second type acoustic waveguide made of a second polymer material having a second acoustic impedance, the first acoustic impedance being different from the second acoustic impedance. Element 2: wherein the plurality of acoustic waveguides includes at least two first type acoustic waveguides aligned in series with at least one second type acoustic waveguide with the at least two first type acoustic waveguides separated by the at least one second type acoustic waveguide, wherein the first acoustic impedance is greater than the second acoustic impedance. Element 3: wherein the plurality of acoustic waveguides includes at least one third type acoustic waveguide made of a third polymer material having a third acoustic impedance, wherein the plurality of acoustic waveguides includes at least two third type acoustic waveguides aligned in series with at least one second type acoustic waveguide with the at least two third type acoustic waveguides separated by the at least one second type acoustic waveguide, and wherein the third acoustic impedance is greater than the second acoustic impedance but smaller than the first acoustic impedance. Element 4: wherein the acoustic device has an axial length that is proportional to an acoustic wavelength of a cable-wave induced acoustic signal. Element 5: wherein the acoustic device represents a single-stage device consisting of three acoustic waveguides in a series arrangement having a total length that corresponds to the axial length of the acoustic device. Element 6: wherein the acoustic device represents a dual-stage device consisting of five acoustic waveguides in a series arrangement having a total length that corresponds to the axial length of the acoustic device. Element 7: wherein the acoustic device represents a multi-stage device consisting of more than five acoustic waveguides in a series arrangement having a total length that corresponds to the axial length of the acoustic device. Element 8: further comprising a second acoustic device coupled to the optical fiber waveguide and axially separated from the acoustic device along the optical fiber waveguide. Element 9: wherein the acoustic device is coupled to the optical fiber waveguide through a fiber interconnector. Element 10: further comprising a sheath disposed about the polymer composite and comprising a metal or a polymer. Element 11: wherein the sheath comprises a plurality of metal wires arranged in a twisted pattern. Element 12: wherein each wire of the plurality of metal wires has different axial orientations at different locations along an axial length of the distributed acoustic sensing cable. Element 13: further comprising at least one of a power transmission line or a data transmission line disposed within the polymer composite. Element 14: wherein the plurality of optical fibers are randomly arranged as embedded within the polymer composite. Element 15: wherein the polymer composite comprises a material selected from the group consisting of a polyolefin, polytetrafluoroethylene-perfluoromethylvinylether polymer, perfluoro-alkoxyalkane polymer, a polytetrafluoroethylene polymer, an ethylene-tetrafluoroethylene polymer, an ethylene-propylene copolymers, poly(4-methyl-1-pentene), polysulfone, polyethersulfone, a polyarylether ketone polymer, polyetherether ketone, a polyphenylene sulfide polymer, a modified polyphenylene sulfide polymer, a polyether ketone polymer, a maleic anhydride modified polymer, a perfluoroalkoxy polymer, a fluorinated ethylene propylene polymer, a polyvinylidene fluoride polymer, a polytetrafluoroethylene-perfluoromethylvinylether polymer, a polyamide polymer, polyurethane, thermoplastic polyurethane, an ethylene chloro-trifluoroethylene polymer, a chlorinated ethylene propylene polymer, a self-reinforcing polymer based on a substituted poly(1,4-phenylene) structure where each phenylene ring has a substituent R group derived from a wide variety of organic groups, any derivative thereof, and any combination thereof. Element 15: wherein the reinforced fibers of the polymer composite are selected from the group consisting of carbon fibers, silicon carbide fibers, aramid fibers, glass fibers, ceramic fiber, metal filaments, nanotubes, any derivative thereof, and any combination thereof.

Element 16: wherein the attenuating comprises transmitting acoustic wave energy relating to the cable-wave induced acoustic signals through the series of acoustic waveguides, a first portion of the acoustic wave energy being absorbed by a first acoustic waveguide of the series of acoustic waveguides, and reflecting a second portion of the acoustic wave energy by a second acoustic waveguide of the series of acoustic waveguides, wherein the second portion is greater than the first portion, and wherein the second acoustic waveguide has a greater impedance than the first acoustic waveguide.

By way of non-limiting example, exemplary combinations applicable to A, B, and C include: Element 1 with Element 2; Element 1 with Element 3; Element 4 with Element 5; Element 4 with Element 6; Element 4 with Element 7; Element 10 with Element 11; and Element 11 with Element 12.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A distributed acoustic sensing cable, comprising:
an optical fiber waveguide that provides light signal transmission; and
an acoustic device coupled to the optical fiber waveguide to facilitate acoustic signal transmission, the acoustic device including:
a polymer composite comprising reinforced fibers embedded therein and having a plurality of acoustic waveguides for attenuating undesirable acoustic waves propagating along the distributed acoustic sensing cable, wherein the plurality of acoustic waveguides includes at least one first type acoustic waveguide made of a first polymer material having a first acoustic impedance and at least one second type acoustic waveguide made of a second polymer material having a second acoustic impedance, the first acoustic impedance being different from the second acoustic impedance, wherein the at least one first type acoustic waveguide and the at least one second type acoustic waveguide are arranged in series and comprise an interface; and a plurality of optical fibers embedded within the polymer composite and extending along an axial length of the acoustic device.

2. The distributed acoustic sensing cable of claim 1, wherein the plurality of acoustic waveguides includes at least two first type acoustic waveguides aligned in series with at least one second type acoustic waveguide with the at least two first type acoustic waveguides separated by the at least one second type acoustic waveguide, wherein the first acoustic impedance is greater than the second acoustic impedance.

3. The distributed acoustic sensing cable of claim 1, wherein the plurality of acoustic waveguides includes at least one third type acoustic waveguide made of a third polymer material having a third acoustic impedance, wherein the plurality of acoustic waveguides includes at least two third type acoustic waveguides aligned in series with at least one second type acoustic waveguide with the at least two third type acoustic waveguides separated by the at least one second type acoustic waveguide, and wherein the third acoustic impedance is greater than the second acoustic impedance but smaller than the first acoustic impedance.

4. The distributed acoustic sensing cable of claim 1, wherein the acoustic device has an axial length at least as long as an acoustic wavelength of an acoustic signal relating to a surrounding environment.

5. The distributed acoustic sensing cable of claim 4, wherein the acoustic device is a single-stage device consisting of three acoustic waveguides in a series arrangement having a total length that corresponds to the axial length of the acoustic device.

6. The distributed acoustic sensing cable of claim 4, wherein the acoustic device is a dual-stage device consisting of five acoustic waveguides in a series arrangement having a total length that corresponds to the axial length of the acoustic device.

7. The distributed acoustic sensing cable of claim 4, wherein the acoustic device is a multi-stage device consisting of more than five acoustic waveguides in a series arrangement having a total length that corresponds to the axial length of the acoustic device.

8. The distributed acoustic sensing cable of claim 1, further comprising a second acoustic device coupled to the optical fiber waveguide and axially separated from the acoustic device along the optical fiber waveguide.

9. The distributed acoustic sensing cable of claim 1, further comprising a sheath disposed about the polymer composite and comprising a metal or a polymer.

10. The distributed acoustic sensing cable of claim 9, wherein the sheath comprises a plurality of metal wires arranged in a twisted pattern.

11. The distributed acoustic sensing cable of claim 10, wherein each wire of the plurality of metal wires has different axial orientations at different locations along an axial length of the distributed acoustic sensing cable.

12. The distributed acoustic sensing cable of claim 1, further comprising at least one of a power transmission line or a data transmission line disposed within the polymer composite.

13. The distributed acoustic sensing cable of claim 1, wherein the plurality of optical fibers are randomly arranged as embedded within the polymer composite.

14. The distributed acoustic sensing cable of claim 1, wherein the polymer composite comprises a material selected from the group consisting of a polyolefin, polytetrafluoroethylene-perfluoromethylvinylether polymer, perfluoro-alkoxyalkane polymer, a polytetrafluoroethylene polymer, an ethylene-tetrafluoroethylene polymer, an ethylene-propylene copolymers, poly(4-methyl-1-pentene), polysulfone, poly ethersulfone, a polyarylether ketone polymer, polyetherether ketone, a polyphenylene sulfide polymer, a modified polyphenylene sulfide polymer, a polyether ketone polymer, a maleic anhydride modified polymer, a perfluoroalkoxy polymer, a fluorinated ethylene propylene polymer, a polyvinylidene fluoride polymer, a polytetrafluoroethylene-perfluoromethylvinylether polymer, a polyamide polymer, polyurethane, thermoplastic polyurethane, an ethylene chloro-trifluoroethylene polymer, a chlorinated ethylene propylene polymer, a self-reinforcing polymer based on a substituted poly(1,4-phenylene) structure where each phenylene ring has a substituent R group derived from a wide variety of organic groups, any derivative thereof, and any combination thereof.

15. The distributed acoustic sensing cable of claim 1, wherein the reinforced fibers of the polymer composite are selected from the group consisting of carbon fibers, silicon carbide fibers, aramid fibers, glass fibers, ceramic fiber, metal filaments, nanotubes, any derivative thereof, and any combination thereof.

16. A method, comprising:
positioning a distributed acoustic sensing cable within a wellbore, the distributed acoustic sensing cable having an optical fiber waveguide and an acoustic device, the acoustic device having a polymer composite and a plurality of optical fibers embedded within the polymer composite, wherein the plurality of optical fibers extends along an axial length of the acoustic device, wherein the polymer composite comprises a plurality of acoustic waveguides for attenuating undesirable acoustic waves propagating along the distributed acoustic sensing cable, wherein the plurality of acoustic waveguides includes at least one first type acoustic waveguide made of a first polymer material having a first acoustic impedance and at least one second type acoustic waveguide made of a second polymer material having a second acoustic impedance, the first acoustic impedance being different from the second acoustic impedance, wherein the at least one first type acoustic waveguide and the at least one second type acoustic waveguide are arranged in series and comprise an interface;
receiving, through the distributed acoustic sensing cable, an output signal consisting of seismic acoustic signals and an input signal to the distributed acoustic sensing cable including the seismic acoustic signals and cable-wave induced acoustic signals, the cable-wave induced acoustic signals being attenuated from the distributed acoustic sensing cable by the acoustic device;
processing the received seismic acoustic signals; and
determining seismic data relating to the wellbore based on the processed seismic acoustic signals.

17. A method, comprising:
receiving an input signal through a series of acoustic waveguides of an acoustic device in a distributed acoustic sensing cable, the input signal comprising seismic acoustic signals and cable-wave induced acoustic signals, wherein the series of acoustic waveguides includes at least one first type acoustic waveguide made of a first polymer material having a first acoustic impedance and at least one second type acoustic waveguide made of a second polymer material having a second acoustic impedance, the first acoustic impedance being different from the second acoustic impedance, wherein the at least one first type acoustic waveguide and the at least one second type acoustic waveguide comprise an interface;

attenuating the cable-wave induced acoustic signals through the series of acoustic waveguides; and providing an output signal consisting of the seismic acoustic signals through the acoustic device.

18. The method of claim 17, wherein the attenuating comprises:

transmitting acoustic wave energy relating to the cable-wave induced acoustic signals through the series of acoustic waveguides, a first portion of the acoustic wave energy being absorbed by a first acoustic waveguide of the series of acoustic waveguides; and reflecting a second portion of the acoustic wave energy by a second acoustic waveguide of the series of acoustic waveguides, wherein the second portion is greater than the first portion, and wherein the second acoustic waveguide has a greater impedance than the first acoustic waveguide.

* * * * *